(12) United States Patent
Kim et al.

(10) Patent No.: US 11,506,793 B2
(45) Date of Patent: Nov. 22, 2022

(54) DISTANCE MEASUREMENT DEVICE AND CONTROL METHOD THEREFOR

(71) Applicant: VC INC., Seoul (KR)

(72) Inventors: Juno Kim, Anyang-si (KR); Hundong Lim, Yongin-si (KR); Sang Il Jin, Seoul (KR)

(73) Assignee: VC INC., Seoul (KR)

( * ) Notice: Subject to any disclaimer, the term of this patent is extended or adjusted under 35 U.S.C. 154(b) by 482 days.

(21) Appl. No.: 16/604,622

(22) PCT Filed: Apr. 18, 2018

(86) PCT No.: PCT/KR2018/004484
§ 371 (c)(1),
(2) Date: Oct. 11, 2019

(87) PCT Pub. No.: WO2018/194362
PCT Pub. Date: Oct. 25, 2018

(65) Prior Publication Data
US 2020/0124738 A1 Apr. 23, 2020

(30) Foreign Application Priority Data

Apr. 21, 2017 (KR) .................. 10-2017-0051859
Nov. 29, 2017 (KR) .................. 10-2017-0162192

(51) Int. Cl.
*G01S 19/19* (2010.01)
*G01S 7/51* (2006.01)
*G01S 17/42* (2006.01)

(52) U.S. Cl.
CPC .............. *G01S 19/19* (2013.01); *G01S 7/51* (2013.01); *G01S 17/42* (2013.01)

(58) Field of Classification Search
CPC . G01S 17/08; G01S 19/19; G01S 7/51; G01S 17/42; G06F 16/444
See application file for complete search history.

(56) References Cited

U.S. PATENT DOCUMENTS 3,552,290 A * 1/1971 Brechtel .............. G09B 29/006
                                                            473/409
8,314,923 B2 * 11/2012 York ...................... A63B 71/06
                                                            356/5.1
(Continued)

FOREIGN PATENT DOCUMENTS

CN          1484539          3/2004
CN          101378812        3/2009
(Continued)

OTHER PUBLICATIONS

SIPO, Search Report of CN 201880026031.0 dated May 25, 2021.
(Continued)

*Primary Examiner* — David L Lewis
*Assistant Examiner* — Robert E Mosser
(74) *Attorney, Agent, or Firm* — Lex IP Meister, PLLC

(57) ABSTRACT

A distance measuring apparatus includes: a display unit; a memory configured to store map information of golf courses; a location acquiring sensor configured to acquire a current location; a distance measuring sensor configured to measure a distance to a target; a slope sensor configured to measure a tilt angle; and a control unit configured to read out map information of a golf course corresponding to the current location from the memory, to calculate a horizontal distance to the target by using the distance to the target and the tilt angle, and to display a course map image on which an object corresponding to the current location and a first lead line connecting points that are spaced from the current location depending on the horizontal distance are displayed, on the display unit.

10 Claims, 11 Drawing Sheets

(56) References Cited

U.S. PATENT DOCUMENTS

2007/0197314 A1   8/2007  York et al.
2012/0109577 A1   5/2012  Nyhart et al.
2017/0010359 A1   1/2017  Jung

FOREIGN PATENT DOCUMENTS

| CN | 202569412 | 12/2012 |
| CN | 104667507 | 6/2015 |
| JP | 2009-291552 | 12/2009 |
| JP | 2015-150061 | 8/2015 |
| KR | 10-2004-0009499 | 1/2004 |
| KR | 10-0915709 | 9/2009 |
| KR | 10-1019862 | 3/2011 |
| KR | 10-2011-0088844 | 8/2011 |
| KR | 10-2013-0092817 | 8/2013 |
| KR | 10-2013-0096036 | 8/2013 |
| KR | 10-2014-0038145 | 3/2014 |
| KR | 10-1582400 | 1/2016 |

OTHER PUBLICATIONS

KIPO, PCT Search Report & Written Opinion of PCT/KR2018/004484 dated Jul. 30, 2017.
SIPO, Search Report of the corresponding Chinese Patent Application No. 201880026031.0 dated Sep. 16, 2020.

\* cited by examiner

DISTANCE MEASUREMENT DEVICE AND CONTROL METHOD THEREFOR

CROSS-REFERENCE TO RELATED APPLICATION

This application claims priority to and benefits of Korean Patent Application No. 10-2017-0051859 filed in the Korean Intellectual Property Office on Apr. 21, 2017, and Korean Patent Application No. 10-2017-0162192 filed in the Korean Intellectual Property Office on Nov. 29, 2017, the entire contents of which are incorporated herein by reference.

BACKGROUND OF THE INVENTION

(a) Field of the Invention

The present disclosure relates to a distance measuring apparatus and a method for controlling the same.

(b) Description of the Related Art

Golf is a sport in which a golfer hits a golf ball into a hole. A golfer determines a target point in consideration of a current location of a golf ball and a location of a hole, and selects an appropriate golf club and hits the golf ball so that the golf ball moves to the target point.

First, in order to determine a location of a hole and a distance from a current location to the hole, a golfer refers to a flag (pin) affixed in a hole and a distance indication fixed facility installed along a fairway. Then, when the golfer recognizes a distance from the current location to the hole, the golfer determines a target point to which the golfer will move the golf ball. However, the location of the hole is frequently changed, so that the fixed facility cannot reflect the momentarily changed location of the hole. Accordingly, it is difficult for the golfer to accurately recognize a distance from the current location to the hole, so that the target point may be a location which is not appropriate for the golfer to hit the golf ball into the hole.

Further, even though an optical target point is determined, the golfer cannot accurately recognize a distance from the current location to the target point. Accordingly, a golf club which the golfer selects in consideration of the distance from the current location to the target point may be a golf club which is not suitable to move the golf ball to the target point.

Recently, a distance measuring apparatus, etc. has been released in order to more accurately measure a distance in a field. However, even when using such a distance measuring apparatus, it is difficult for the golfer to know where the target point is in the field. In addition, if there is an obstacle blocking the view in front of the golfer, it is difficult for the golfer to measure the distance to the target point beyond the obstacle.

SUMMARY OF THE INVENTION

Technical Problem

An object of the present disclosure is to solve the aforementioned problems and other problems. Another object is to provide a distance measuring apparatus for displaying information related to a target point in a field, and a control method thereof.

Still another object is to provide a distance measuring apparatus for displaying distance information in a field, and a control method thereof.

Technical Solution

The present invention has been made in an effort to provide a distance measuring apparatus including: a display unit; a memory configured to store map information of golf courses; a location acquiring sensor configured to acquire a current location; a distance measuring sensor configured to measure a distance to a target; a slope sensor configured to measure a tilt angle; and a control unit configured to read out map information of a golf course corresponding to the current location from the memory, to calculate a horizontal distance to the target by using the distance to the target and the tilt angle, and to display a course map image on which an object corresponding to the current location and a first lead line connecting points that are spaced from the current location depending on the horizontal distance are displayed, on the display unit.

The first leader line may include a curved line that connects points spaced apart from the current location by the horizontal distance.

The control unit may further display a second leader line connecting points that are separated from the current location by a first horizontal distance, on the course map image, by using the map information.

The course map information may include information related to the course map image, scale information of the course map image, and information related to location coordinates corresponding to reference points of the course map image.

The first leader line may include a curved line connecting points that are spaced apart from the current location by using the horizontal distance.

$$h01 = d0 \times \sin a01 \qquad \text{(Equation 1)}$$

$$a02 = f(X0), \text{ and} \qquad \text{(Equation 2)}$$

$$X0 = d0 \times \cos a01 + (h01 + h02) \div \tan a02 \qquad \text{(Equation 3)}$$

wherein $h01$ may indicate an altitude difference, $d0$ may indicate a straight line distance, $a01$ may indicate a tilt angle, $a02$ may indicate an expected landing angle, $h02$ may indicate a height of the distance measuring apparatus from the ground, and $X0$ may indicate an attack distance.

The control unit may further display a second leader line connecting points that are separated from the current location by a first target distance on the course map image by using the map information, and the points and the first attack distance may be calculated by using Equations 1 to 3.

The first leader line may be displayed in a different form from the second leader line.

The distance measuring apparatus may further include an azimuth sensor configured to measure an azimuth, and the control unit may further display an imaginary line corresponding to the azimuth on the course map image.

The control unit may further display a leader line indicating a point of interest located in a direction corresponding to the azimuth on the course map image by using the current location, the azimuth, and the map information.

The control unit may calculate an attack distance from the current location to the point of interest, and further displays the attack distance to the point of interest on the course map image.

The present invention has been made in an effort to provide a control method of a distance measuring apparatus, including: acquiring, by a location acquiring sensor, a current location of the distance measuring apparatus; reading out, by a control unit, map information of golf courses corresponding to the current location from a memory in which the map information of the golf courses is stored; measuring, by a distance measuring sensor, a distance to a target; measuring, by a slope sensor, a sloped tilt angle; calculating, by the control unit, a horizontal distance to the target by using the distance to the target and the tilt angle; and displaying, by the control unit, a course map image on which an object corresponding to the current location and a first lead line connecting points that are spaced from the current location depending on the horizontal distance are displayed, on the display unit.

The first leader line may include a curved line that connects points spaced apart from the current location by the horizontal distance.

After the displaying, by the control unit, image on which the first leader line is displayed, on the display unit, the control method further includes displaying, by the control unit, a second leader line connecting points that are separated from the current location by a first horizontal distance, on the course map image, by using the map information.

The course map information may include information related to the course map image, scale information of the course map image, and information related to location coordinates corresponding to reference points of the course map image.

The first leader line may include a curved line connecting points that are spaced apart from the current location by using the horizontal distance.

$$h01 = d0 \times \sin a01 \quad \text{(Equation 1)}$$

$$a02 = f(X0), \text{ and} \quad \text{(Equation 2)}$$

$$X0 = d0 \times \cos a01 + (h01 + h02) \div \tan a02, \quad \text{(Equation 3)}$$

wherein h01 may indicate the altitude difference, d0 may indicate the straight line distance, a01 may indicate the tilt angle, a02 may indicate the expected landing angle, h02 may indicate the height of the distance measuring apparatus from the ground, and X0 may indicate the attack distance.

Before the allowing of the distance measuring sensor to measure the distance to the target, the control method further includes displaying, by the control unit, a second leader line connecting points that are separated from the current location by a first target distance on the course map image by using the map information, wherein the points and the first attack distance are calculated by using Equations 1 to 3.

The first leader line may be displayed in a different form from the second leader line.

The control method may further include: measuring, by the azimuth sensor, an azimuth to which the distance measuring apparatus is directed; and displaying, by the control unit, an imaginary line corresponding to the azimuth on the course map image.

The control method may further include displaying, by the control unit, a leader line indicating a point of interest located in a direction corresponding to the azimuth on the course map image by using the current location, the azimuth, and the map information.

The control method may further include calculating, by the control unit, an attack distance from the current location to the point of interest, and displaying, by the control unit, the attack distance to the point of interest on the course map image.

Advantageous Effects

The effects of the distance measuring apparatus and the control method thereof according to the present disclosure will be described as follows.

According to at least one of the exemplary embodiments of the present disclosure, a golfer can easily check distance information in a field.

According to at least one of the embodiments of the present disclosure, a golfer can easily check distance information to a target point.

The additional range of applicability of the present disclosure will become apparent from the following detailed description. However, since various modifications and alternatives within the spirit and scope of the present disclosure may be clearly understood by those skilled in the art, it is to be understood that a detailed description and a specific exemplary embodiment of the present invention such as an exemplary embodiment of the present invention are provided only by way of example.

DETAILED DESCRIPTION OF THE EMBODIMENTS

Figure 1:
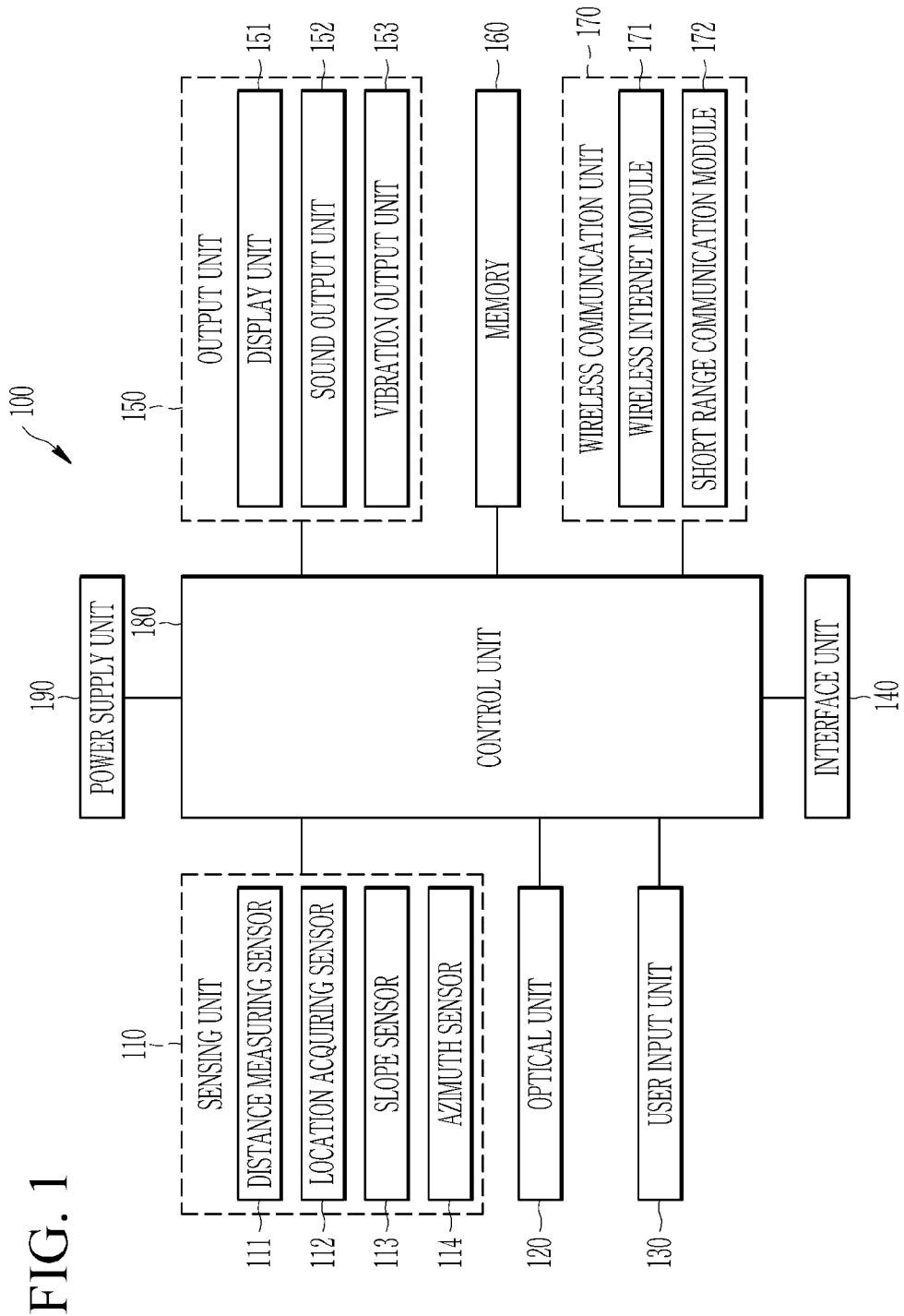
FIG. 1 illustrates a block diagram for describing a distance measuring apparatus according to an exemplary embodiment.

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present invention may obscure the gist of the present invention, it will be omitted. The accompanying drawings are provided only in order to allow exemplary embodiments disclosed in the present specification to be easily understood and are not to be interpreted as limiting the spirit disclosed in the present specification, and it is to be understood that the present invention includes all modifications, equivalents, and substitutions without departing from the scope and spirit of the present invention.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprises" and "have" used in the present specification specify the presence of stated features, numerals, steps, operations, components, parts, or combinations thereof, but do not preclude the presence or addition of one or more other features, numerals, steps, operations, components, parts, or combinations thereof.

Figure 2:
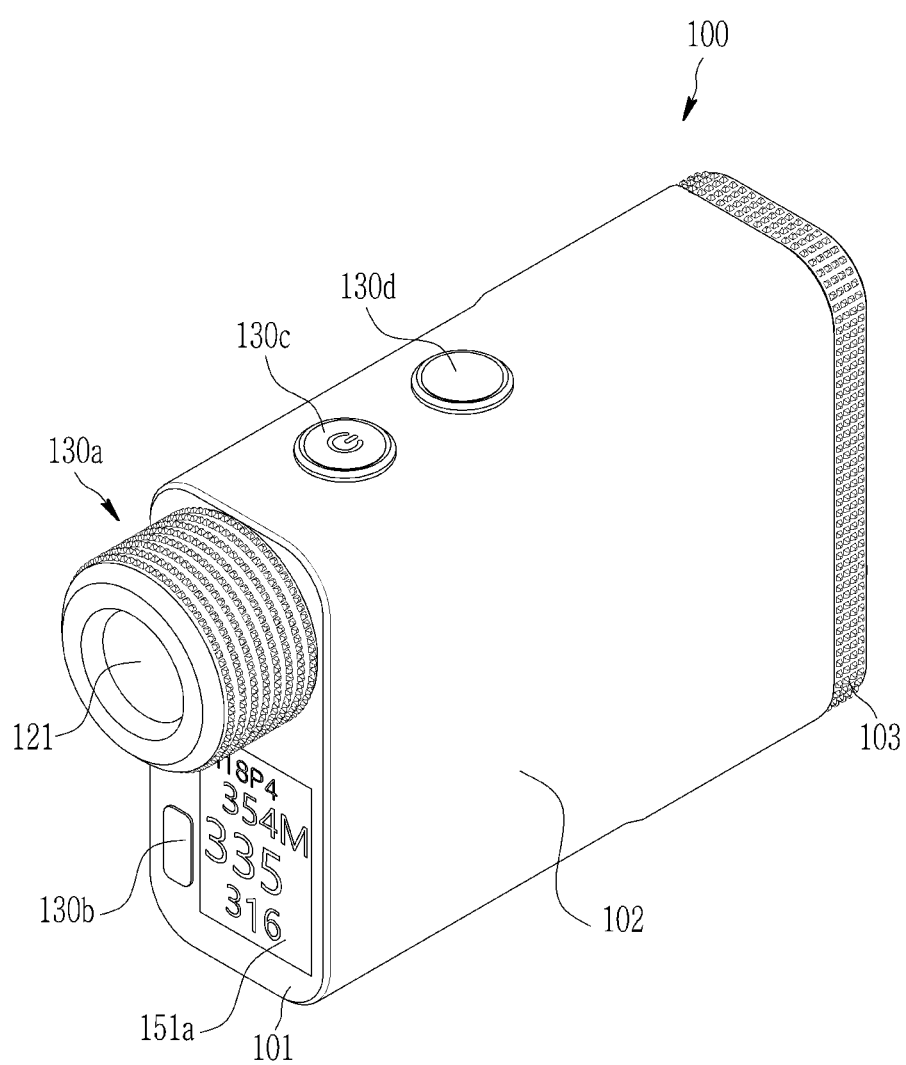
FIG. 2 and FIG. 3 illustrate schematic diagrams of examples of a distance measuring apparatus viewed in different directions according to an exemplary embodiment.
Figure 3:
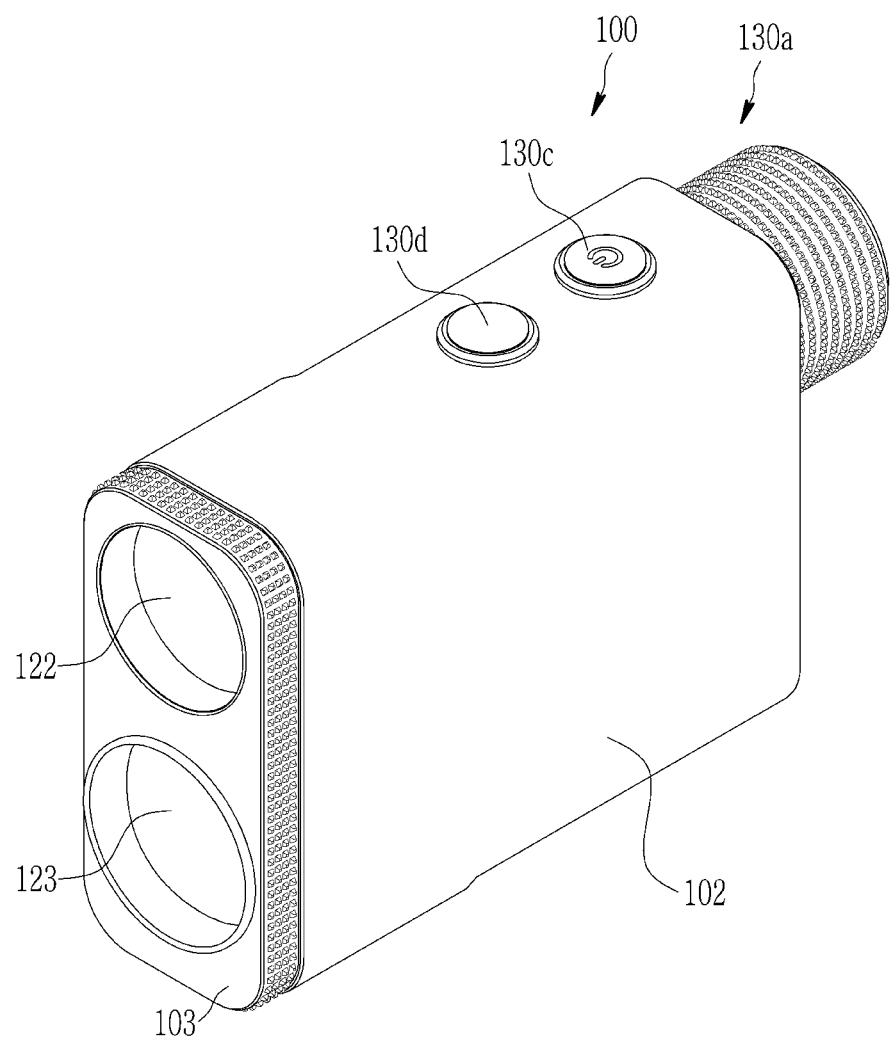

FIG. 1 illustrates a block diagram for describing a distance measuring apparatus 100 according to an exemplary embodiment, and FIG. 2 and FIG. 3 illustrate schematic diagrams of examples of the distance measuring apparatus 100 viewed in different directions according to an exemplary embodiment.

The distance measuring apparatus 100 may include a sensing unit 110, an optical unit 120, a user input unit 130, an interface unit 140, an output unit 150, a memory 160, a wireless communication unit 170, a control unit 180, a power supply unit 190, and the like. The constituent elements shown in FIG. 1 are not essential for implementing the distance measuring apparatus 100, so the distance measuring apparatus 100 described in the present specification may include more or less constituent elements than the foregoing listed constituent elements.

More particularly, among the constituent elements, the sensing unit 110 may include one or more sensors for sensing at least one of information on an environment surrounding the distance measuring apparatus 100 and information within the distance measuring apparatus 100. For example, the sensing unit 110 may include at least one of a distance measuring sensor 111, a location acquiring sensor 112, an acceleration sensor 113, an azimuth sensor 114, a gyroscope sensor, a battery gauge, and an environment sensor (for example, a barometer, a hydrometer, and a thermometer). In the meantime, the distance measuring apparatus 100 disclosed in the present specification may utilize a combination of information sensed by at least two or more sensors among the sensors.

First, the distance measuring sensor 111 refers to a sensor which measures a distance to a target. The distance measuring sensor 111 may include an ultrasonic sensor, an infrared sensor (IR sensor), a laser sensor, a radio detecting and ranging sensor (radar sensor), an optical sensor (for example, a camera), and the like. The distance measuring sensor 111 is not limited to the listed kinds of sensors, and includes all kinds of sensors measuring a distance to a target.

Hereinafter, it is assumed that the distance measuring sensor 111 is a laser sensor, which transmits a laser in a front direction and receives a laser reflected from a target to measure a distance to a target.

The location acquiring sensor 112 is a sensor for acquiring a location of the distance measuring apparatus 100, and a representative example of the location acquiring sensor 112 is a global positioning system (GPS) sensor. The GPS sensor calculates distance information from three or more separate satellites and accurate time information and then applies trigonometry to the calculated information, thereby accurately calculating 3D current location information according to the latitude, the longitude, and the altitude. Currently, a method of calculating location and time information by using three satellites and correcting errors of the calculated location and time information by using one other satellite is widely used. Further, the GPS sensor may calculate speed information by continuously calculating a current location in real time.

The slope sensor 113 may acquire the degree of tilt of the distance measuring apparatus 100. The slope sensor 113 may include an acceleration sensor (accelerometer) measuring gravitational acceleration. Further, the slope sensor 113 may also be implemented by a scheme of calculating a tilt by using a rotation angle in a vertical direction from a predetermined reference direction acquired by a gyro sensor, and the like.

The azimuth sensor 114 is a sensor measuring an azimuth, and may acquire a value of an azimuth, to which the distance measuring apparatus 100 is directed. The azimuth sensor 114 may be a geomagnetic sensor, which detects the earth's magnetic field and measures an azimuth. Further, the azimuth sensor 114 may also be implemented by a scheme of calculating an azimuth by using a rotation angle in a horizontal direction from a predetermined reference direction acquired by a gyro sensor, and the like.

The optical unit 120 has a structure for receiving external light, and may include a lens unit, a filter unit, and the like. The optical unit 120 optically processes light from a subject.

The lens unit may include a zoom lens, a focusing lens, a compensating lens, and the like, and the filter unit may include an ultraviolet filter (UV filter), an optical low pass filter, and the like.

Next, the user input unit 130 receives input of information from a user, and when information is input through the user input unit 130, the control unit 180 may control an operation of the distance measuring apparatus 100 so as to correspond to the input information. The user input unit 130 may include a mechanical input means (for example, a mechanical key, a button located on a front surface, a rear surface, or a lateral surface of the distance measuring apparatus 100, a dome switch, a jog wheel, and a jog switch) and a touch-type input means. For example, the touch-type input means may be formed of a virtual key, a soft key, or a visual key displayed on a touch screen through software processing, or a touch key disposed in a portion other than the touch screen. In the meantime, the virtual key or the visual key may be displayed on the touch screen with various forms, and for example, the virtual key or the visual key may be formed of a graphic, a text, an icon, a video, or a combination thereof.

The interface unit 140 serves as a passage of various kinds of external devices connected with the distance measuring apparatus 100. The interface unit 140 may include at least one of an external charger port, a wired/wireless data port, and a memory 160 card port. The distance measuring apparatus 100 may perform an appropriate control related to the connected external device in response to the connection of the external device to the interface unit 140.

The output unit 150 generates an output related to a visual sense, an auditory sense, or a tactile sense, and may include a display unit 151, a sound output unit 152, a vibration output unit 153, and the like.

The display unit 151 displays (outputs) information processed by the distance measuring apparatus 100. For example, the display unit 151 may display execution image information of an application program driven in the distance measuring apparatus 100, or user interface (UI) and graphical user interface (GUI) information according to the execution image information.

The display unit 151 may include at least one of a liquid crystal display (LCD), a thin film transistor-liquid crystal display (TFT LCD), an organic light-emitting diode (OLED), and an e-ink display.

In addition, two or more display units 151 may exist according to an implementation form of the distance measuring apparatus 100. In this case, the plurality of display units 151 may be disposed together on an external surface of the distance measuring apparatus 100 and in an internal portion of the distance measuring apparatus 100, or the plurality of display units 151 may be individually disposed on an external surface of the distance measuring apparatus 100 and in an internal portion of the distance measuring apparatus 100, respectively.

A display unit 151a disposed on the external surface of the distance measuring apparatus 100 may include a touch sensor, which detects a touch to the display unit 151a, so as to receive an input of a control command by a touch scheme. When a touch is input to the display unit 151a by using the display unit 151a, the touch sensor may detect the touch, and the control unit 180 may generate a control command corresponding to the touch based on the detected touch. Contents input by the touch scheme may be letters or numbers, or may be menu items indicatable or designable in various modes.

A display unit 151b disposed in the internal portion of the distance measuring apparatus 100 may display an image to a user through an ocular lens 121 of the distance measuring apparatus 100. The display unit 151b disposed in the internal portion of the distance measuring apparatus 100 includes a transparent display (or a semi-transparent display), which is directly located on an optical path of the ocular lens 121. A representative example of the transparent display is a transparent OLED (TOLED). Further, the display unit 151b disposed in the internal portion of the distance measuring apparatus 100 may be an opaque display, which provides an image to the optical path of the ocular lens 121 through an optical member having a function of refracting or reflecting light and the like.

The sound output unit 152 may output audio data stored in the memory 160 in the form of a sound, and may be implemented in the form of a loudspeaker, which outputs various alarm sounds or a playback sound of multimedia.

The vibration output unit 153 generates various tactile effects that the user may feel. Intensity, a pattern, and the like of the vibration generated by the vibration output unit 153 may be controlled by a selection of the user or a setting of the control unit 180. For example, the vibration output unit 153 may also combine and output different vibrations or sequentially output different vibrations.

In addition, the output unit 150 may further include a light output unit, which outputs a signal notifying of generation of an event by using light of a light source.

Further, the memory 160 stores data (for example, the data includes course map information about a tee box, a fairway, a hazard, a bunker, a rough, a green, a hole of a golf course, and the like, but is not limited thereto) supporting various functions of the distance measuring apparatus 100. The memory 160 may store firmware and an application program driven in the distance measuring apparatus 100, and data and commands for an operation of the distance measuring apparatus 100. At least some of the application programs may be installed in the distance measuring apparatus 100 at the time of shipment for the basic function of the distance measuring apparatus 100. Further, at least some of the application programs may be downloaded from an external server through wireless communication. In the meantime, the application program may be stored in the memory 160 and is installed in the distance measuring apparatus 100, thereby being driven so as to perform the operation (or the function) of the distance measuring apparatus 100 by the control unit 180.

The wireless communication unit 170 may include one or more modules which are capable of establishing wireless communication between the distance measuring apparatus 100 and a wireless communication system, the distance measuring apparatus 100 and other available wireless communication devices, or the distance measuring apparatus 100 and an external server.

The wireless communication unit 170 may include a wireless Internet module 171 and a short range communication module 172.

The wireless Internet module 171 refers to a module for wireless Internet connection, and may be embedded in the distance measuring apparatus 100. The wireless Internet module 171 is configured to transmit and receive wireless signals in a communication network according to wireless Internet technologies. The wireless Internet module 171 transceives a wireless signal in a communication network according to the wireless Internet technologies. Examples of the wireless Internet technology include a Wireless Local Area Network (WLAN), Wireless Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A), and the wireless Internet module 171 transceives data according to at least one wireless Internet technology in a range including Internet technology which is not listed above.

The short range communication module 172 is for short range communication, and may support short range communication by using at least one of Bluetooth™, Radio Frequency Identification (RFID), Infrared Data Association (IrDA), Ultra Wideband (UWB), ZigBee, Near Field Communication (NFC), Wi-Fi, Wi-Fi direct, and Wireless Universal Serial Bus (USB) technologies. The short range communication module 172 may support wireless communication between the distance measuring apparatus 100 and a wireless communication system, the distance measuring apparatus 100 and a wireless communication available device, or the distance measuring apparatus 100 and a network, in which an external server is located, through a wireless area network. The wireless area network may be a wireless personal area network.

Herein, the wireless communication available device may be a wearable device (for example, a smart watch and smart glasses) which is capable of exchanging (interlocking) data with the distance measuring apparatus 100 according to the present invention. The short range communication module 172 may detect (or recognize) a wearable device which is capable of communicating with the distance measuring apparatus 100, around the distance measuring apparatus 100. Further, when the detected wearable device is a device authenticated to communicate with the distance measuring apparatus 100 according to the exemplary embodiment, the control unit 180 may transmit at least a part of the data processed in the distance measuring apparatus 100 to the wearable device through the short range communication module 172. Accordingly, a user of the wearable device may use the data processed in the distance measuring apparatus 100 through the wearable device.

The control unit 180 generally controls a general operation of the distance measuring apparatus 100 in addition to the operation related to the application program. The control unit 180 processes the input or output signal, data, information, and the like or drives the application program stored in the memory 160 through the foregoing constituent elements, thereby providing the user with or processing the appropriate information or function.

Further, the control unit 180 may control at least a part of the constituent elements described with reference to FIG. 1 in order to drive the application program stored in the memory 160. The control unit 180 may combine two or more of the constituent elements included in the distance measuring apparatus 100 and operate the combined constituent elements for driving the application program.

The power supply unit 190 receives power from an external power source and an internal power source, and supplies the power from the power source to each constituent element included in the distance measuring apparatus 100 under the control of the control unit 180. The power supply unit 190 includes a battery, and the battery may be an embedded battery or a replaceable battery.

At least a part of the constituent elements may cooperate with each other and be operated for operating, controlling, or implementing a method for controlling the distance measuring apparatus 100 according to various exemplary embodiments described below. Further, the operation, the control, or the method for controlling the distance measuring apparatus 100 may be implemented in the distance measuring apparatus 100 through driving of at least one application program stored in the memory 160.

Referring to FIGS. 2 and 3, the disclosed distance measuring apparatus 100 includes a body having the form of a column, of which a front surface and a rear surface have oval track shapes. However, the present invention is not limited thereto, and is applicable to various structures, such as a watch type, a clip type, a glasses type, or a slide type, and a swing type and a swivel type in which two or more bodies are combined to be relatively movable. The form of the body may be related to a specific type of distance measuring apparatus 100, but a description of the specific type of distance measuring apparatus 100 may be generally applied to a distance measuring apparatus 100 of other types.

Herein, the body may be understood as a concept of the distance measuring apparatus 100 being considered as at least one assembly.

The distance measuring apparatus 100 includes a case (for example, a frame, a housing, and a cover) configuring an exterior appearance. As shown, the distance measuring apparatus 100 may include a front case 101, a middle case 102, and a rear case 103. Various electronic components are disposed in an internal space formed by a combination of the front case 101, the middle case 102, and the rear case 103.

The cases may be formed by injecting a synthetic resin or may be formed of a metal, for example, stainless steel (STS), aluminum (Al), and titanium (Ti), and external portions of the cases may also be covered with leather, rubber, and the like.

An ocular lens 121, a first operation unit 130*a*, a second operation unit 130*b*, and a display unit 151*a* may be disposed in the front case 101. In this case, the first operation unit 130*a* may be disposed in the form of a jog wheel in a circumference of the ocular lens 121, thereby protecting the ocular lens 121.

A third operation unit 130*c* and a fourth operation unit 130*d* may be disposed on one surface of the middle case 102. The user may conveniently operate the third operation unit 130*c* and the fourth operation unit 130*d* while holding the distance measuring apparatus 100.

One or more object lens 122 and 123 may be disposed in the rear case 103. The object lens 122 and 123 may receive light from the outside. For example, the object lens 122 located at the upper side may receive light from a subject to enable the user to check the subject by eye through the ocular lens 121. When the laser emitted from the distance measuring apparatus 100 is reflected from the target, the object lens 123 located at the lower side may receive the reflected laser.

The configurations are not limited to the foregoing disposition. The configurations may be excluded or replaced as necessary, or may be disposed in other surfaces. For example, the display unit 151*a* and the second operation unit 130*b* may not be provided in the front surface of the body, and the number of operation units 130*a*, 130*b*, 130*c*, and 130*d* may be changed.

Next, the optical unit 120 and the distance measuring sensor 111 of the distance measuring apparatus 100 will be described in detail with reference to FIG. 4.

Figure 4:
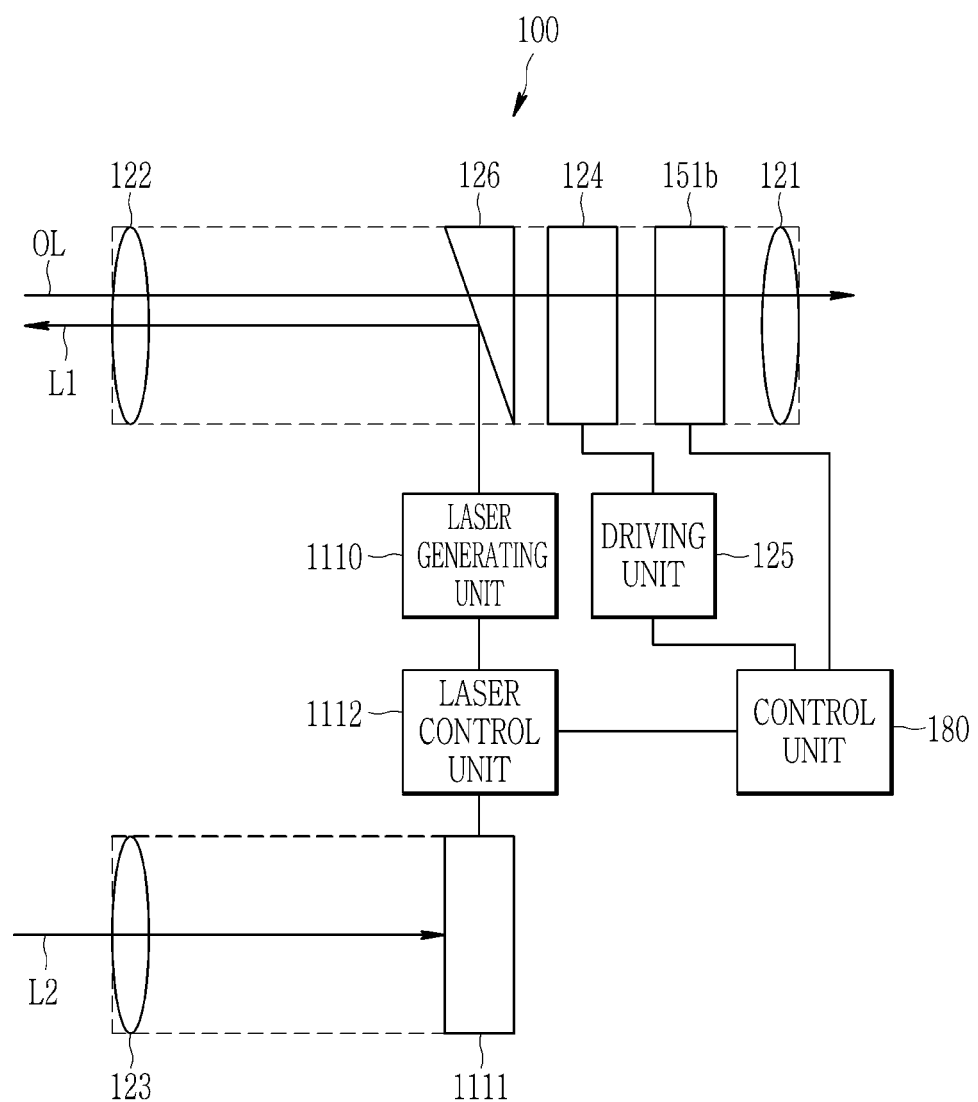
FIG. 4 illustrates a schematic structural diagram of an optical unit and a distance measuring sensor of a distance measuring apparatus according to an exemplary embodiment.

FIG. 4 is a schematic structural diagram of the optical unit 120 and the distance measuring sensor 111 of the distance measuring apparatus 100 related to one exemplary embodiment.

The distance measuring apparatus 100 according to one exemplary embodiment includes the two object lens 122 and 123, one ocular lens 121, a light path changing unit 126, a light processing unit 124, the display unit 151*a*, a laser generating unit 1110, a laser receiving unit 1111, a laser control unit 1112, and the control unit 180.

Through the first object lens 122, external light OL may be incident to the distance measuring apparatus 100, or a laser L1 generated in the laser generating unit 1110 may be emitted to the outside. A path of the laser L1 generated in the laser generating unit 1110 may be changed through the light path changing unit 126 so that the laser L1 heads to the first object lens 122.

The external light OL passes through the first object lens 122 and the light path changing unit 126 to be incident to the light processing unit 124. The light processing unit 124 includes a lens unit and a filter unit. The external light OL incident to the light processing unit 124 is optically processed and heads to the ocular lens 121 side. The lens unit processes light according to the driving of a driving unit 125. For example, when the user operates the first operation unit 130*a* and the like, the driving unit 125 is driven and a zoom lens moves, so that a zoom-in or zoom-out operation is performed.

Through the second object lens 123, a laser L2 reflected from the target may be incident to the distance measuring apparatus 100. The laser receiving unit 1111 receives the laser L2 incident through the second object lens 123, and outputs a corresponding signal to the laser control unit 1112.

Then, the laser control unit 1112 may calculate a distance from the distance measuring apparatus 100 to the target by using the signal received from the laser receiving unit 1111. The calculated distance value is output to the control unit 180.

The display unit 151b may be formed of a transparent or semi-transparent display and be directly disposed in a path through which the external light OL passes. Otherwise, the display unit 151b may provide an image to the optical path of the ocular lens 121 through an optical member having a function of refracting or reflecting light and the like.

Hereinafter, a control method implementable by the distance measuring apparatus 100 formed as described above and relevant exemplary embodiments will be described with reference to the accompanying drawings. It is obvious to those skilled in the art that the present invention may be embodied in another specific form within a range of a spirit and an essential characteristic of the present invention.

A control method of the distance measuring apparatus 100 according to a first exemplary embodiment will be described with reference to FIG. 5 to FIG. 7.

Figure 5:
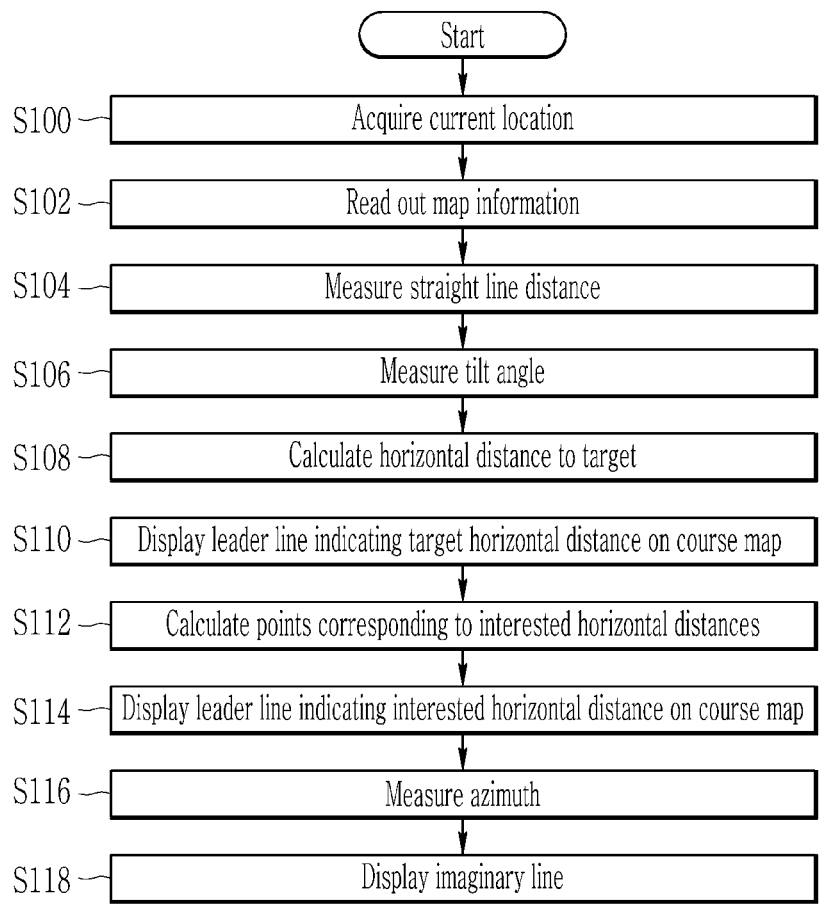
FIG. 5 illustrates a flowchart of a control method of a distance measuring apparatus according to a first exemplary embodiment.
Figure 6:
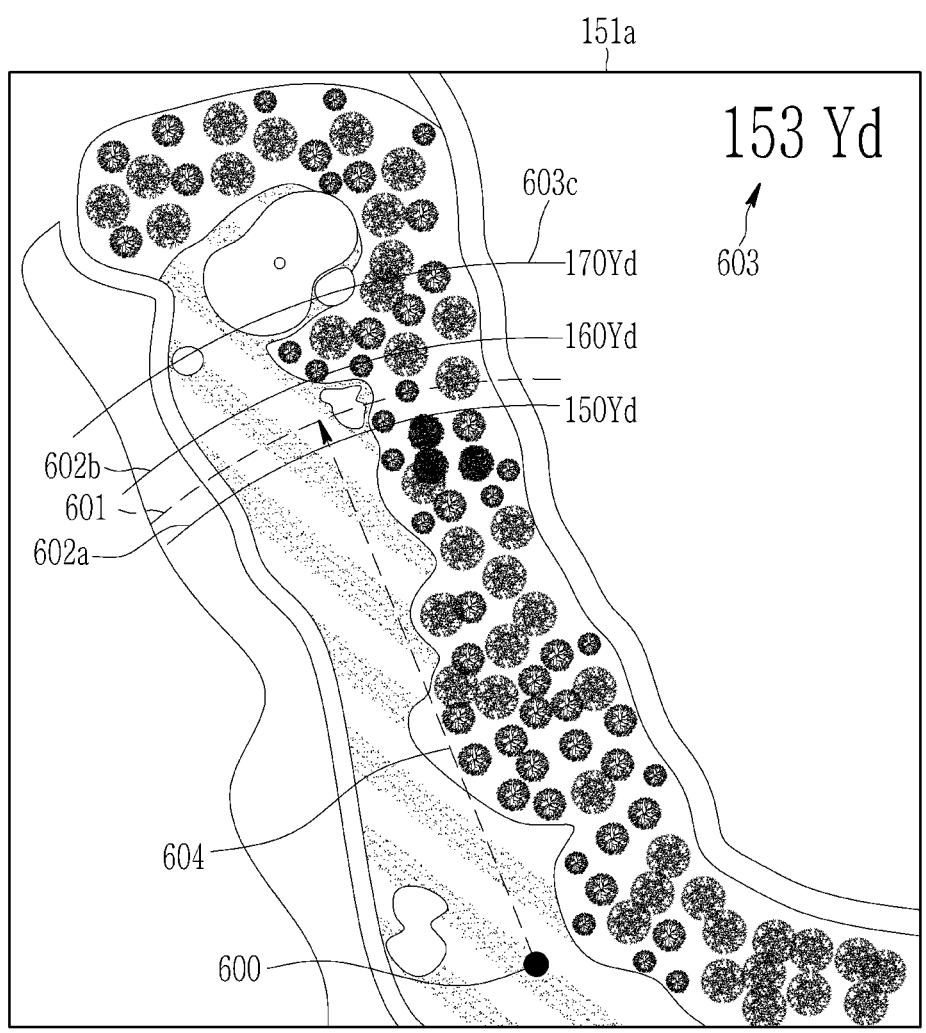
FIG. 6 illustrates a screen displayed on a display unit of a distance measuring apparatus according to the control method of FIG. 5.
Figure 7:
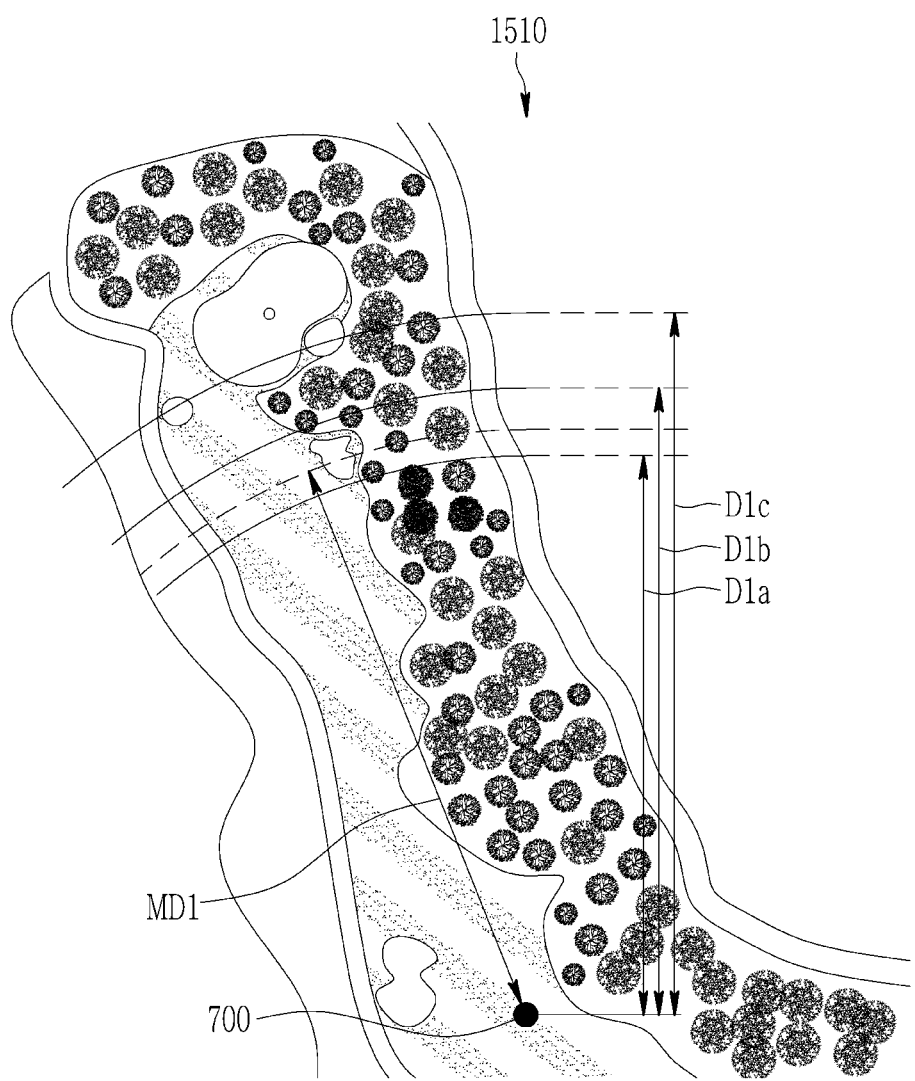
FIG. 7 illustrates an exemplary diagram showing a method of calculating points corresponding to a horizontal distance of interest according to the control method of FIG. 5.

FIG. 5 illustrates a flowchart of a control method of the distance measuring apparatus according to the first exemplary embodiment, FIG. 6 illustrates a screen displayed on a display unit 151a of the distance measuring apparatus 100 according to the control method of FIG. 5, and FIG. 7 illustrates an exemplary diagram showing a method of calculating points corresponding to a horizontal distance of interest according to the control method of FIG. 5.

First, the location acquiring sensor 112 acquires a current location (S100). The location acquiring sensor 112 may acquire coordinates of the current location of the distance measuring apparatus 100.

The control unit 180 reads course map information corresponding to the coordinates of the current location from the memory 160 (S102). The course map information may include map image information of a course, scale information of a map image, location coordinate information corresponding to reference points of the map image, and the like.

The control unit 180 may determine a course including the current location by using location coordinate information corresponding to reference points (e.g., including, but not limited to, four corners of a rectangular map image) of the map image of the course map information.

The distance measuring sensor 111 measures a straight line distance from the distance measuring apparatus 100 to a target 200 (S104), and the slope sensor 113 measures an angle of tilt (hereinafter referred to as a tilt angle) in which the distance measuring apparatus 100 is directed (S106). The order of step S104 and step S106 is not limited thereto.

Then, the control unit 180 calculates a horizontal distance from the distance measuring apparatus 100 to the target according to Equation 1 by using the measured straight line distance and the tilt angle.

$$L = D \times \cos TA \quad \text{(Equation)}$$

In Equation, L indicates a horizontal distance from the distance measuring apparatus 100 to the target, D indicates a straight line distance measured by the distance measuring sensor 111, and TA indicates a tilt angle.

Then, as illustrated in FIG. 6, the control unit 180 displays a course map image on which an object 600 corresponding to the current location and a leader line 601 indicating the horizontal distance calculated by the distance measuring apparatus 100 are displayed, on the display unit 151a.

The control unit 180 may determine the location of the object corresponding to current location coordinates in the map image by using the current location coordinates location coordinate information corresponding to the reference points, and scale information of the map image.

A leader line 602 may be displayed spaced apart from the object 600 corresponding to the current location of the course map by a length corresponding to a horizontal distance to the target in the course map image. As illustrated in FIG. 7, the control unit 180 may calculate a length MD1 corresponding to the horizontal distance to the target in a course map image 1510 by using the scale information of the map image.

For example, the leader line 602 may be displayed as a portion of a sector arc having a radius length corresponding to the horizontal distance to the target and a center where the object 600 corresponding to the current location is disposed. In addition, the leader line 602 may be displayed in various shapes, and it is not limited to the arc shape.

In this case, the control unit 180 may further display a horizontal distance 603 from the current location to the target on the display unit 151a.

The control unit 180 calculates points corresponding to the horizontal distances of interest (S112).

The control unit 180 may calculate points spaced apart from the current location by a predetermined horizontal distance. For example, the control unit 180 may calculate points spaced apart by a horizontal distance of 10 yards from the current location. The control unit 180 may calculate points 10 yards apart, points 20 yards apart, points 30 yards away from the current location, and the like. The predetermined horizontal distance is not limited to 10 yards, but may be changed to 10 meters, 20 yards, or the like, but it is not limited thereto.

The horizontal distance of interest includes a horizontal distance that is adjacent to the horizontal distance to the target among the predetermined horizontal distances. For example, when the horizontal distance to the target is calculated to be 153 yards, the horizontal distances of interest include 130 yards, 140 yards, 150 yards, 160 yards, 170 yards, and the like. The horizontal distances of interest include distances ranging from 70% to 130% of the horizontal distance. Such a range may be changed to 80% to 120%, 90% to 130%, and the like, but it is not limited thereto.

The control unit 180 may calculate points corresponding to the horizontal distances of interest on the map image by using the map image information of the course and scale information of the map image. Reference is also made to FIG. 7 in this regard.

As illustrated in FIG. 7, the control unit 180 may determine a point 700 corresponding to the current location on a course map image 1510. The control unit 180 may calculate lengths D1a, D1b, and D1c corresponding to the respective horizontal distances of interest by using the horizontal distances of interest and the scale of the map image 1510. The control unit 180 may calculate coordinates of the sector arc (or functions representing the arc) having a center where the point 700 is positioned, and radius lengths which are the lengths D1a, D1b, and D1c as the points corresponding to the horizontal distances of interest on the map image.

Then, as illustrated in FIG. 6, the control unit 180 displays a course map image on which leader lines 602a, 602b, and 602c indicating the horizontal distances of interest are displayed on the display unit 151a (S114). In this case, the control unit 180 may further display values of the horizontal distances of interest to correspond to the leader lines 602a, 602b, and 602c on the display unit 151a.

The leader lines 602a, 602b, and 602c may be displayed in a form that is different from the leader line 601. For example, the leader line 601 may be displayed as a thicker line than the leader lines 602a, 602b, and 602c. In addition, the leader line 601 may have a color that is different from that of the leader lines 602a, 602b, and 602c.

Optionally, the azimuth sensor 114 measures an azimuth in a direction in which the distance measuring apparatus 100 faces (S116).

Then, the control unit 180 displays a course map image on which the object 600 corresponding to the current location and an imaginary line 604 corresponding to a direction in which the distance measuring apparatus 100 faces, on the display unit 151a (S118).

When coordinates of the current location measured by the location acquiring sensor 112 are changed, the control unit 180 moves and displays the object 600 on the course map to correspond to the changed coordinates. When the horizontal distance to the target measured by the azimuth sensor 114 is changed, the control unit 180 changes and displays the leader line 601 on the course map image to correspond to the horizontal distance to the target.

Next, a control method of the distance measuring apparatus 100 according to the second exemplary embodiment will be described with reference to FIG. 8 to FIG. 10.

Figure 8:
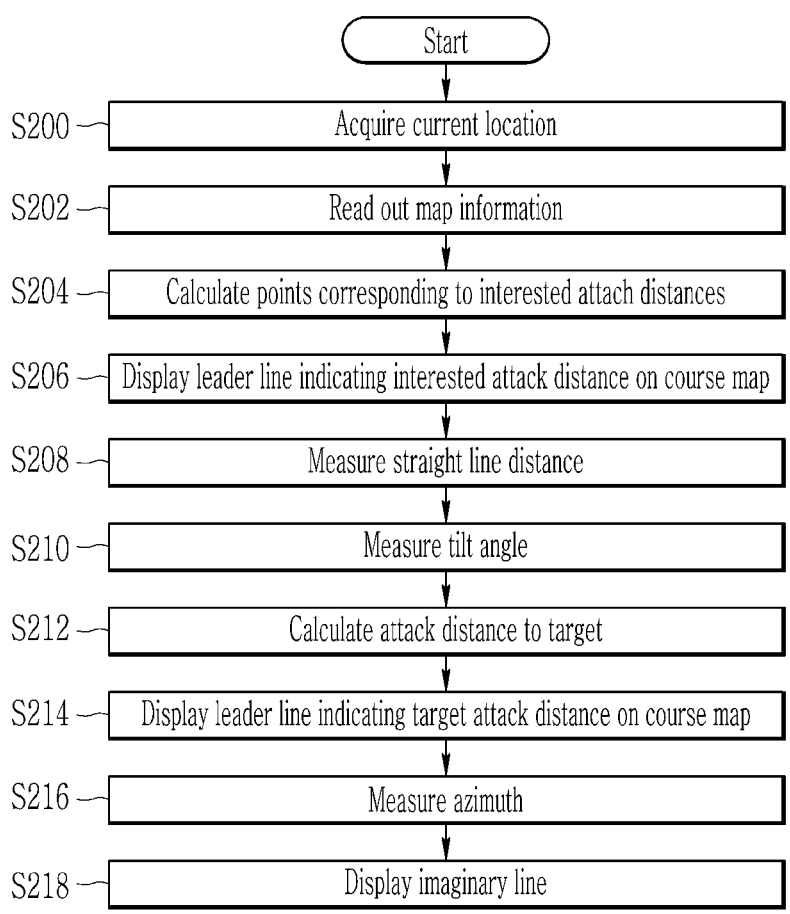
FIG. 8 illustrates a flowchart of a control method of a distance measuring apparatus according to a second exemplary embodiment.
Figure 9:
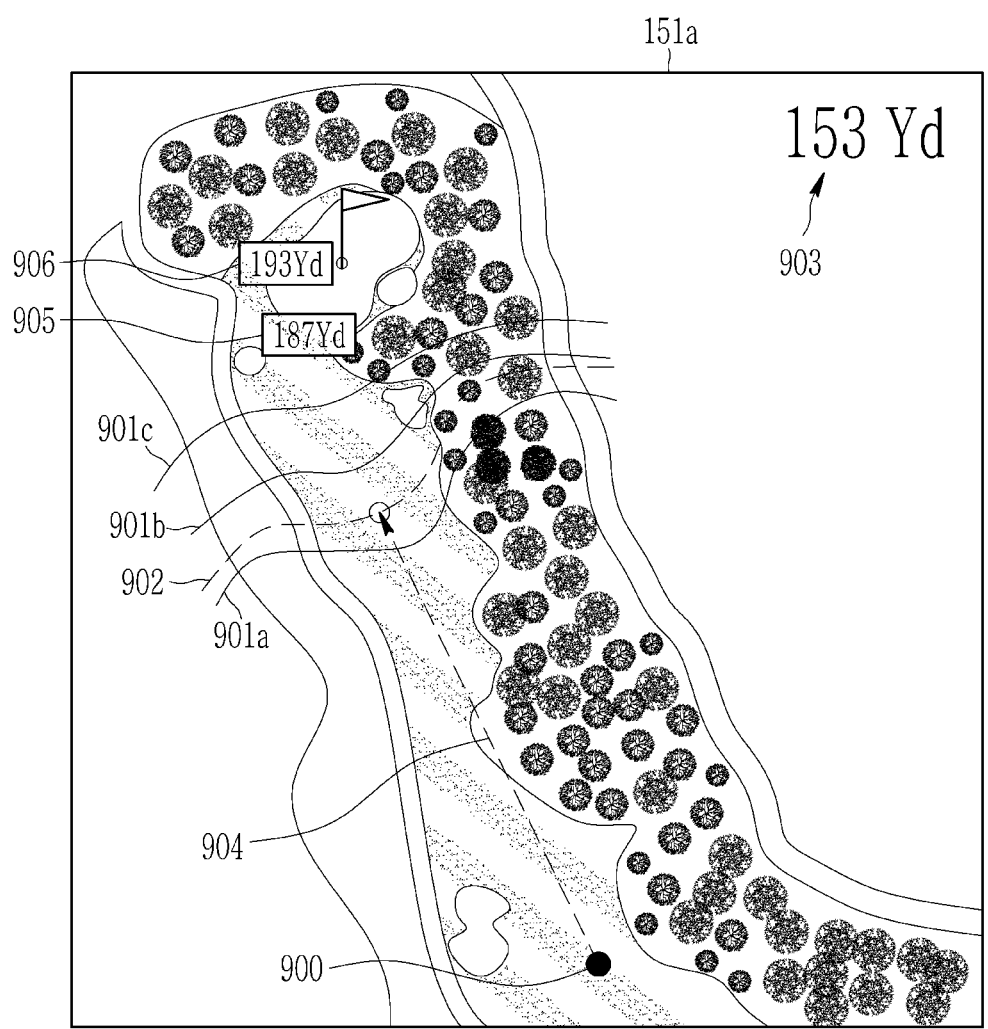
FIG. 9 illustrates a screen displayed on a display unit of a distance measuring apparatus according to the control method of FIG. 8.

FIG. 8 illustrates a flowchart of the control method of the distance measuring apparatus according to the second exemplary embodiment, and FIG. 9 illustrates a screen displayed on a display unit 151a of the distance measuring apparatus 100 according to the control method of FIG. 8.

First, the location acquiring sensor 112 acquires a current location (S200). The location acquiring sensor 112 may acquire coordinates of the current location of the distance measuring apparatus 100.

The control unit 180 reads course map information corresponding to the coordinates of the current location from the memory 160 (S202). The course map information includes location coordinate information of each point divided by a predetermined unit (e.g., a pixel unit, a predetermined length (1 yard or 1 meter) unit, a GPS coordinate unit, etc.) in a golf course. The location coordinate information may include altitude information of each point. In addition, the course map information may include map image information of a course, scale information of a map image, location coordinate information corresponding to reference points of the map image, and the like.

Next, the control unit 180 calculates points corresponding to attack distances of interest (S112). Regarding the attack distance, a description will be given with reference to FIG. 10.

A point 200 in the course has a corresponding altitude value. The control unit 180 may calculate a horizontal distance L0 and an altitude difference h01 between the two points by Equation 1 by using coordinates of a current point and coordinates of the point 200.

$$H01 = d0 \times \sin a01 \quad \text{(Equation 1)}$$

Then, the control unit 180 may calculate the attack distance X0 to the target 200 by Equation 2 using the horizontal distance L0 and the altitude difference h01.

$$X0 = d0 \times \cos a01 + (h01 + h02) \div \tan a02 \quad \text{(Equation 2)}$$

Herein, X0 indicates the attack distance, L0 indicates a horizontal distance from the distance measuring apparatus 100 to the target 200, and h02 indicates a height from a golf ball 10 to the distance measuring apparatus 100. h02 may be any value that can be set by a user input. Alternatively, h02 may be a value obtained by measuring a vertical distance from the ground using the distance measuring sensor 111. When a straight line distance d0 is equal to or greater than a predetermined distance value (e.g., 150 m, etc.), h02 may be ignored in the equations.

In this case, a relationship between the attack distance X0 and an expected landing angle a02 of the golf ball 10 is expressed by Equation 3.

$$a02 = f(X0) \quad \text{(Equation 3)}$$

That is, the attack distance X0 and the expected landing angle a02 may be expressed as a function as in Equation 3, and a type of the function is not limited to a linear function, a secondary function, and the like. For example, the attack distance X0 and the expected landing angle a02 may be expressed as a linear function, as shown in Equation 4 below.

$$a02 = -i \times X1 + j \quad \text{(Equation 4)}$$

Herein, i and j are constant values, which may be selected by a user or the control unit 180. For example, when the user is male, i may be selected as 0.11 and j may be selected as 67, and when the user is female, i may be selected as 0.11 and j may be selected as 60. However, the i value and j value of the present invention are not limited thereto. Alternatively, the attack distance X0 and the expected landing angle a02 may also be expressed as a secondary function, as shown in Equation 5 below.

$$a02 = -l \times X1^2 + m \times X1 + n \quad \text{(Equation 5)}$$

Herein, L, m, and n are constant values, which may be selected by a user or the control unit 180.

In addition, the attack distance X0 may be calculated by using the horizontal distance L0 and the angle a1 formed by a line connecting the current point and the point 200 with the ground, but it is not limited thereto.

The control unit 180 may use the method to calculate points (or functions of the points) at which the attack distance X0 satisfies values of the distances of interest.

Then, as illustrated in FIG. 9, the control unit 180 displays a course map image on which an object 900 corresponding to the current position and leader lines 901a, 901b, and 901c indicating attack distances of interest are displayed, on the display unit 151a (S206). In this case, the control unit 180 may further display values of the attack distances of interest to correspond to the leader lines 901a, 901b, and 901c on the display unit 151a. These leader lines 901a, 901b, and 901c may have a free curved line shape.

The distance measuring sensor 111 measures a straight line distance from the distance measuring apparatus 100 to a target 200 (S208), and the slope sensor 113 measures a tilt angle of the distance measuring apparatus 100 (S210). The order of step S208 and step S210 is not limited thereto.

Then, the control unit 180 calculates the attack distance to the target by using the measured straight distance and the tilt angle (S212). The control unit 180 may calculate the attack distance to the target by using Equations 1 to 5 and Equation 6 below.

Figure 10:
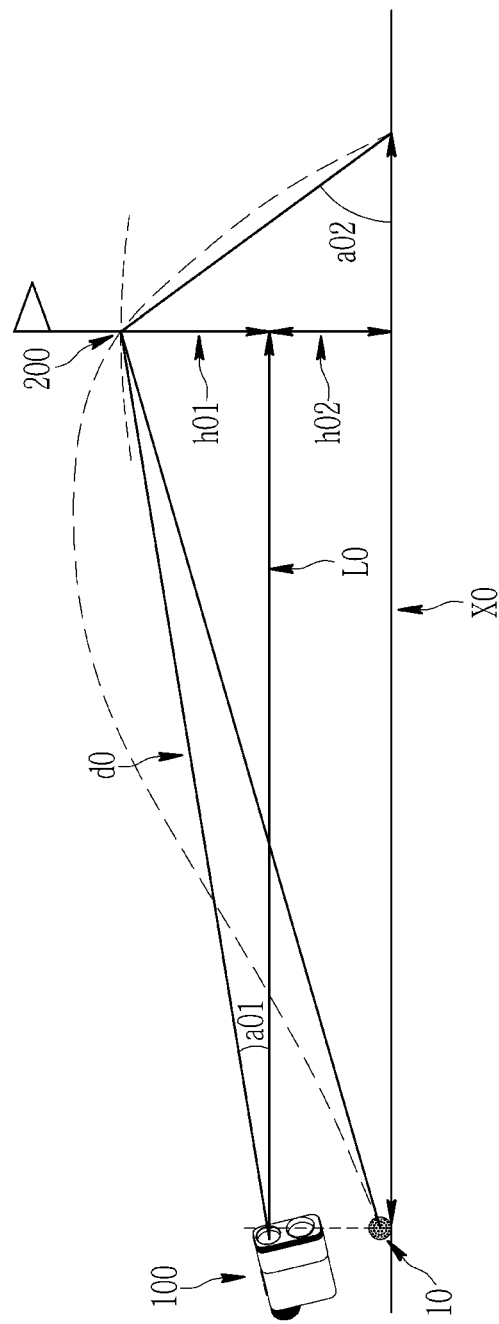
FIG. 10 illustrates an exemplary diagram showing a method of calculating an attack distance according to the control method of FIG. 8.

Referring to FIG. 10, in relation to the calculation of the attack distance X0, a height h01 from the distance measuring apparatus 100 to the target 200 may be calculated using Equation 6.

$$h01 = d0 \times \sin a01 \quad \text{(Equation 6)}$$

Herein, d0 indicates the straight line distance to the target 200 (distance to the target 200 measured by the distance measuring sensor 111), a01 indicates the tilt angle of the distance measuring apparatus 100, and h01 indicates a height (altitude difference) from the distance measuring apparatus 100 to the target 200.

The control unit 180 may calculate the horizontal distance from the distance measuring apparatus 100 to the target 200 through Equation 1, may calculate the height (altitude difference) from the distance measuring apparatus 100 to the target 200 through Equation 6, and may calculate the target distance by using Equation 2 and Equation 3.

Then, the control unit 180 displays a course map image on which a leader line 902 indicating the target distance to the target calculated by the distance measuring apparatus 100 is displayed, on the display unit 151a (S214). This leader line 902 may have a free curved line shape.

The leader lines 901a, 901b, and 901c may be displayed in a different form from the leader line 601. For example, the leader line 902 may be displayed as a thicker line than the leader lines 901a, 901b, and 901c. In addition, the leader line 902 may have a color that is different from that of the leader lines 901a, 901b, and 901c.

Optionally, the azimuth sensor 114 measures an azimuth in a direction in which the distance measuring apparatus 100 faces (S216).

Then, the control unit 180 displays a course map image on which the object 600 corresponding to the current location and an imaginary line 604 corresponding to a direction in which the distance measuring apparatus 100 faces, on the display unit 151a (S218).

When points of interest such as a hazard, a bunker, a rough, a green, a hole, etc. are positioned in a direction in which the distance measuring apparatus 100 is directed, the control unit 180 may additionally display the points of interest and leader lines 905 and 906 indicating the distance to the points of interest on the course map. In this case, the control unit 180 may additionally display distances from the current point to the points of interest (e.g., a distance from the current location to the point at which the hazard, bunker, or green starts in the direction that the distance measuring apparatus 100 faces, a distance from the current location to the point where the hazard, bunker, or green ends, a distance from the current location to the hole, etc.)

When coordinates of the current location measured by the location acquiring sensor 112 are changed, the control unit 180 moves and displays the object 600 on the course map to correspond to the changed coordinates. When the attack distance to the target measured by the azimuth sensor 114 is changed, the control unit 180 changes and displays the leader line 902 on the course map image to correspond to the attack distance to the target.

According to the distance measuring apparatus 100 and the control method of the distance measuring apparatus 100 described above, a user can easily check the distance information in the field.

In addition, according to the distance measuring apparatus 100 and the control method of the distance measuring apparatus 100 described above, a user can easily check the distance information to the target point.

Next, a screen provided by a display unit 151b disposed inside the distance measuring apparatus 100 will be described with reference to FIG. 11.

Figure 11:
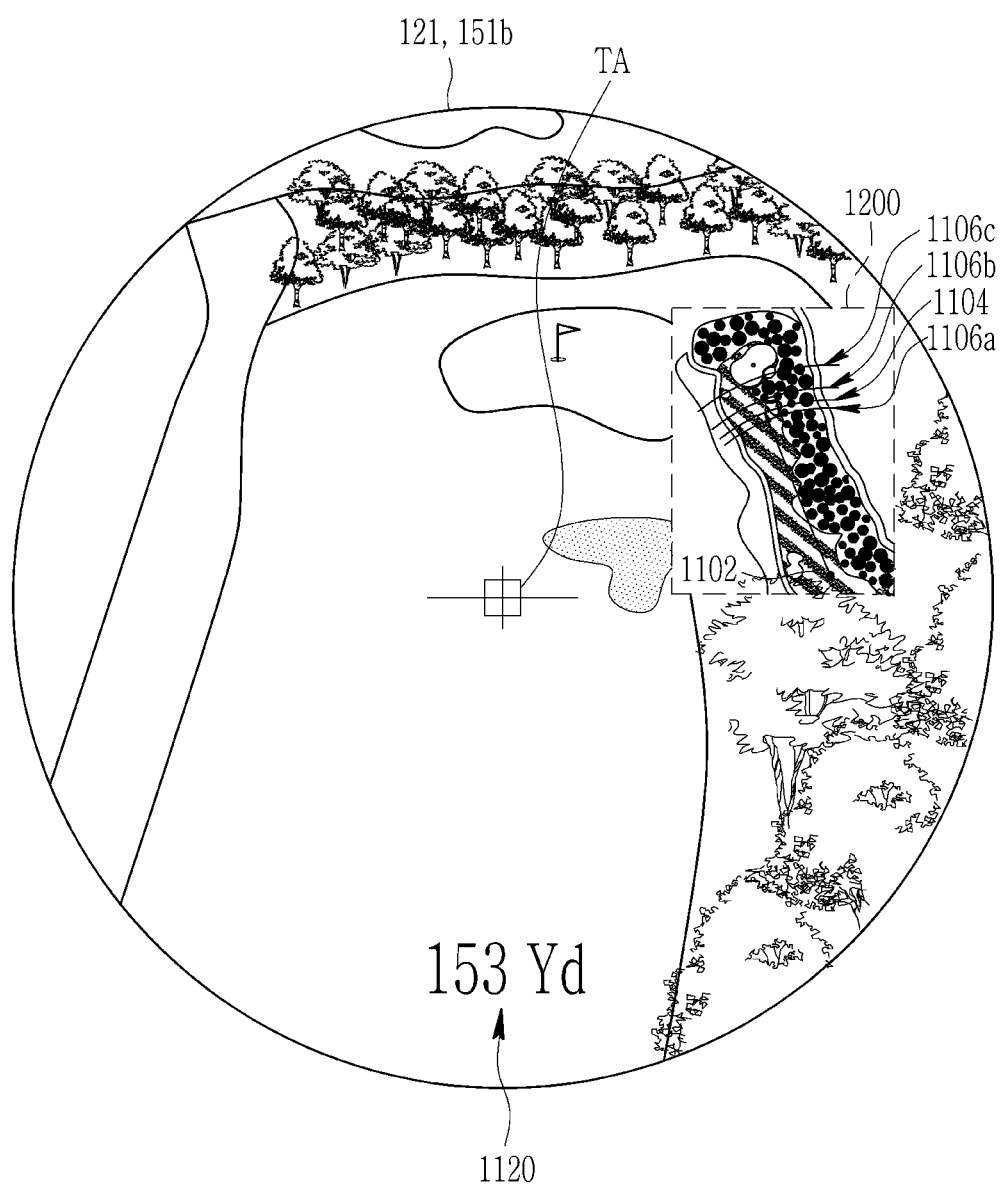
FIG. 11 illustrates a screen displayed on the display unit according to the control method of the exemplary embodiments.

FIG. 11 illustrates a screen displayed on the display unit 151b according the control method of the exemplary embodiments.

A user may see an external subject through an ocular lens 121. The user may measure the distance to the target positioned in a target aiming indicator TA by using the distance measuring apparatus 100.

The control unit 180 may display a course map image 1200 on the display unit 151b disposed inside the distance measuring apparatus 100. The course map image 1200 may display an object 1102 corresponding to the current location, a leader line 1104 indicating a horizontal distance to the target, and leader lines 1106a, 1106b, and 1106c indicating distances of interest.

In addition, the control unit 180 may additionally display an indicator 1108 indicating the distance to the target on the display unit 151b.

As a result, the user may conveniently check information related to the current location, the distance to the target, and the distances of interest through a golf course map displayed on the display unit 151b while checking an actual golf course with the ocular lens 121.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A distance measuring apparatus comprising:
a display unit;
a memory configured to store map information of golf courses;
a location acquiring sensor configured to acquire a current location;
a distance measuring sensor configured to measure a distance to a target;
a slope sensor configured to measure a tilt angle; and
a control unit configured to read out map information of a golf course corresponding to the current location from the memory, to calculate a horizontal distance to the target by using the distance to the target and the tilt angle, and to display a course map image on which an object corresponding to the current location and a first lead line connecting points that are spaced by an attack distance calculated using the horizontal distance from the current location are displayed, on the display unit,
wherein
the attack distance is calculated by using $$h01 = d0 \times \sin a01 \quad \text{(Equation 1)}$$

$$a02 \times -i \times X0 + j, \text{ and} \quad \text{(Equation 2)}$$

$$X0 = d0 \times \cos a01 + (h01 + h02) \div \tan a02 \quad \text{(Equation 3)}$$

wherein h01 indicates an altitude difference between the distance measuring apparatus and the target, d0 indicates a straight line distance, a01 indicates a tilt angle, a02 indicates an expected landing angle, i and j are constants, h02 indicates a height of the distance measuring apparatus from the ground, and X0 indicates an attack distance.

2. The distance measuring apparatus of claim 1, wherein the course map information includes information related to the course map image, scale information of the course map image, and information related to location coordinates corresponding to reference points of the course map image.

3. The distance measuring apparatus of claim 1, further comprising
an azimuth sensor configured to measure an azimuth,
wherein the control unit further displays an imaginary line corresponding to the azimuth on the course map image.

4. The distance measuring apparatus of claim 3, wherein the control unit further displays a leader line indicating a point of interest located in a direction corresponding to the azimuth on the course map image by using the current location, the azimuth, and the map information.

5. The distance measuring apparatus of claim 4, wherein the control unit calculates a horizontal distance from the current location to the point of interest, and further displays the horizontal distance to the point of interest on the course map image.

6. A control method of a distance measuring apparatus, the method comprising:
Acquiring, by a location acquiring sensor, a current location of the distance measuring apparatus;
reading out, by a control unit, map information of golf courses corresponding to the current location from a memory in which the map information of the golf courses is stored;
measuring, by a distance measuring sensor, a distance to a target;
measuring, by a slope sensor, a sloped tilt angle;
calculating, by the control unit, a horizontal distance to the target by using the distance to the target and the tilt angle; and
displaying, by the control unit, a course map image on which an object corresponding to the current location and a first lead line connecting points that are spaced by an attack distance calculated using the horizontal distance from the current location are displayed, on the display unit;
wherein the attack distance is calculated by using $$h01 = d0 \times \sin a01 \quad \text{(Equation 1)}$$

$$a02 = -i \times X0 + j, \text{ and} \quad \text{(Equation 2)}$$

$$X0 = d0 \times \cos a01 + (h01 + h02) \div \tan a02 \quad \text{(Equation 3)}$$

wherein h01 indicates an altitude difference between the distance measuring apparatus and the target, d0 indicates a straight line distance, a01 indicates a tilt angle, a02 indicates an expected landing angle, i and j are constants, h02 indicates a height of the distance measuring apparatus from the ground, and X0 indicates an attack distance.

7. The control method of claim 6, wherein
the course map information includes information related to the course map image, scale information of the course map image, and information related to location coordinates corresponding to reference points of the course map image.

8. The control method of claim 6, further comprising:
measuring, by the azimuth sensor, an azimuth to which the distance measuring apparatus is directed; and
displaying, by the control unit, an imaginary line corresponding to the azimuth on the course map image.

9. The control method of claim 8, further comprising
displaying, by the control unit, a leader line indicating a point of interest located in a direction corresponding to the azimuth on the course map image by using the current location, the azimuth, and the map information.

10. The control method of claim 9, further comprising
calculating, by the control unit, an horizontal distance from the current location to the point of interest; and
displaying, by the control unit, the horizontal distance to the point of interest on the course map image.

* * * * *